Dec. 18, 1923.
W. W. CROCKER
EGG BEATER
Filed Sept. 19, 1923
1,477,943
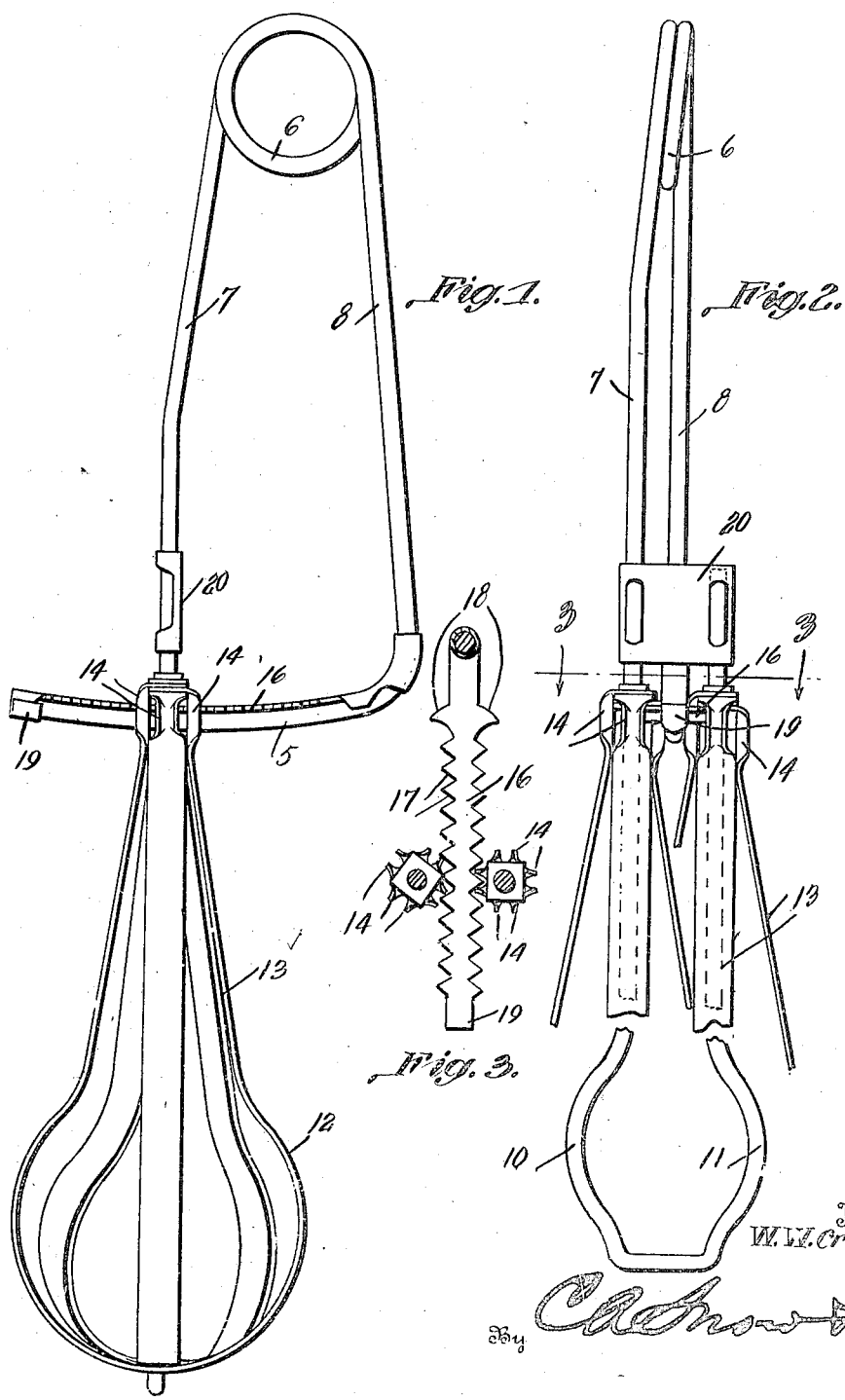

Patented Dec. 18, 1923.

1,477,943

UNITED STATES PATENT OFFICE.

WILLIAM W. CROCKER, OF SALINA, KANSAS.

EGG BEATER.

Application filed September 19, 1923. Serial No. 663,678.

*To all whom it may concern:*

Be it known that I, WILLIAM W. CROCKER, a citizen of the United States, residing at Salina, in the county of Saline and State of Kansas, have invented a new and useful Egg Beater, of which the following is a specification.

The present invention relates to egg beaters or rotary mixers, the primary object of the invention being to provide a device of this character which may be efficiently controlled by one hand of the operator, leaving the other hand free to add material to the egg or material being agitated.

Another important object of the invention is to provide a device of this character including a construction exceptionally cheap to manufacture, the gears employed for rotating the beating members being formed integral with the beating members.

A further object of the invention is the provision of a rack bar having means to restrict movement of the beating elements throughout the length of the rack bar to insure against the beating members and gears formed at the upper ends thereof, from passing beyond the ends of the rack bar.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view of a device constructed in accordance with the invention.

Figure 2 is an end elevational view thereof.

Figure 3 is a sectional view taken on line 3—3 of Figure 2.

Referring to the drawing in detail, the device embodies a handle portion formed of a length of wire and having a right angled end portion 5. This handle portion is formed by bending the length of wire intermediate its length to provide a loop portion 6, which loop portion tends to move the sections 7 and 8 forming the handle, away from each other when the sections 7 and 8 have been moved towards each other by the operator.

The body portion of the device includes a continuation of the section 7, and as shown, the section 7 extends downwardly at 10 and upwardly at 11, the portion 11 extending in parallel relation with the portion 10 to provide supports for the beaters to be hereinafter more fully described.

Each of the beaters comprises a length of relatively wide metal bent intermediate its ends to provide curved portions 12 and arms 13, the arms being formed with outwardly extended flanges 14 disposed adjacent to their upper ends. These flanges provide teeth to be engaged by the rack bar 16 that is supported on the right angled end 5 of the handle portion, whereby movement of the section 8 of the handle portion towards and away from the section 7 will cause a relative movement of the rack bar to rotate the agitating members.

The rack bar is also formed of a length of metal having teeth 17 cut in the side edges thereof, the teeth 18 thereof, formed adjacent to the inner end of the rack bar being relatively large to set up a binding action between the rack bar and flanges 14 to restrict movement of the sections 7 with respect to the section 8.

At the outer end of the rack bar is a socket member 19 that fits over the outer end of the right angled portion 5 to secure the rack bar to the right angled portion 5 in a manner to prevent displacement thereof.

The portions 10 and 11 are held in spaced relation with each other by means of the spacing plate 20 which is formed with openings to receive the upper end of the portion 10 and a section of the portion 11 as clearly shown by Figure 2 of the drawing. It might be further stated that the beaters are arranged in pairs and formed with openings to accommodate portions of the body portion to allow the beaters to revolve thereon.

In the use of the device, it is obvious that by gripping the sections 7 and 8 constituting the handle portion of the device, and moving the sections toward each other, rotary movement will be imparted to the beaters by the reciprocation of the rack bar 16.

What I claim as new is:—

1. In an egg beater, a length of wire material bent to provide a body portion and a handle portion, beating members mounted to rotate on the body portion, said beating members having flanges providing teeth and a rack bar carried by the handle portion and adapted to move by the beating members to rotate the beating members.

2. In an egg beater, a length of wire material bent to provide a body portion and a handle portion, the handle portion comprising opposed sections, one of the sections having a right angled end portion, a rack bar on the right angled end portion, rotatable beating members mounted on the body portion and having flanges providing teeth, said rack bar adapted to move by the flanges to rotate the beating members, and said beating members being arranged in pairs.

3. In a device of the character described, a body portion and a handle portion, beating members carried on the body portion, said beating members including lengths of metal bent intermediate their ends to provide lower curved portions, and upper arms, said arms having flanges extending outwardly therefrom, and disposed adjacent to the upper ends thereof, and means carried by the handle portion and cooperating with the flanges to rotate the beating members.

4. In a device of the character described, a body portion and a handle portion, beaters on the body portion, each of said beaters including a length of metal bent to provide curved beating portions, the ends of the length of metal being bent to provide flanges constituting gear teeth, and means carried by the handle and cooperating with the gear teeth to rotate the beaters.

5. In a device of the character described, a body portion and a handle portion, beaters rotatably mounted on the body portion, each of said beaters comprising a length of metal bent to provide curved beating portions, the edges of the length of metal adjacent to the ends thereof being bent to provide laterally extending flanges, and means carried by the handle and cooperating with the flanges to rotate the beaters.

6. In a device of the class described, a beater including outwardly bent portions cooperating to form gear teeth, and means engaging said portions for rotating the beater.

7. In a device of the character described, spaced beaters mounted for rotation, each beater having integral outwardly extended portions cooperating to form gear teeth, and means movable between and engaging said portions to simultaneously rotate the beaters.

8. In a device of the class described, a beater including a looped strip having outwardly bent portions at the ends thereof cooperating to form gear teeth.

In testimony that I claim the foregoing as my own, I have hereto affixed my signature in the presence of two witnesses.

WILLIAM W. CROCKER.

Witnesses:
CARL NELSON,
WILLIAM R. BROOKHOUSE.